(12) United States Patent
Gaudiani et al.

(10) Patent No.: US 12,246,268 B2
(45) Date of Patent: Mar. 11, 2025

(54) OVERLOAD PROTECTION CHAMBER FOR FLUID SEPARATION APPARATUS AND SYSTEM

(71) Applicant: OSI Environmental, LLC, North Royaltaon, OH (US)

(72) Inventors: Michael A. Gaudiani, Shaker Heights, OH (US); Douglas C. Corbin, Twinsburg, OH (US)

(73) Assignee: OSI Environmental, LLC., North Royalton, OH (US)

( * ) Notice: Subject to any disclaimer, the term of this patent is extended or adjusted under 35 U.S.C. 154(b) by 0 days.

(21) Appl. No.: 18/610,605

(22) Filed: Mar. 20, 2024

(65) Prior Publication Data

US 2024/0216832 A1 Jul. 4, 2024

Related U.S. Application Data

(62) Division of application No. 16/693,879, filed on Nov. 25, 2019, now Pat. No. 11,964,221.

(51) Int. Cl.
*B01D 17/02* (2006.01)
*B01D 17/04* (2006.01)
(Continued)

(52) U.S. Cl.
CPC ....... *B01D 17/0214* (2013.01); *B01D 17/045* (2013.01); *B01D 21/2422* (2013.01);
(Continued)

(58) Field of Classification Search
CPC .............. B01D 17/0214; B01D 17/045; B01D 21/2422; B01D 21/2427; C02F 1/40;
(Continued)

(56) References Cited

U.S. PATENT DOCUMENTS 1,459,486 A 6/1923 Whitney et al.
1,626,245 A 4/1927 Little et al.
(Continued)

FOREIGN PATENT DOCUMENTS

DE 4110091 A1 11/1991

OTHER PUBLICATIONS

Engineering toolbox, https://www.engineeringtoolbox.com/specific-gravity-liquid-fluids-d_294.html (Year: 2006).
(Continued)

*Primary Examiner* — Liam Royce
(74) *Attorney, Agent, or Firm* — Hahn Loeser & Parks LLP; Daniel J. Smola; Joel S. Sonnenberg

(57) ABSTRACT

A mixed fluid separator apparatus includes an overload protection chamber that prevents a large and sudden influx of oil from fouling a coalescing separator. To prevent sudden influx of a large concentration of oil from overwhelming the coalescing separator, a separate overload protection chamber is connected to a main coalescing separator apparatus. The overload protection chamber includes a water drain (majority water with some oil) to the main coalescing separator apparatus and an oil overflow (majority oil with some water) to drain excess oil when necessary to prevent overfilling of the coalescing separator apparatus. The overload protection chamber functions to rapidly separate and remove heavy concentrations of oil, protecting the main coalescing separator apparatus.

20 Claims, 12 Drawing Sheets

(51) Int. Cl.
*B01D 21/24* (2006.01)
*C02F 1/40* (2023.01)
*C02F 101/32* (2006.01)
*C02F 103/32* (2006.01)
*C02F 103/36* (2006.01)

(52) U.S. Cl.
CPC ............ *B01D 21/2427* (2013.01); *C02F 1/40* (2013.01); *C02F 2101/32* (2013.01); *C02F 2103/32* (2013.01); *C02F 2103/322* (2013.01); *C02F 2103/365* (2013.01); *C02F 2209/40* (2013.01); *C02F 2209/42* (2013.01)

(58) Field of Classification Search
CPC ............ C02F 2101/32; C02F 2103/32; C02F 2103/322; C02F 2103/365; C02F 2103/22; C02F 2209/40; C02F 2209/42; C02F 2201/005; E03F 5/16
See application file for complete search history.

(56) References Cited

U.S. PATENT DOCUMENTS

| | | | |
|---|---|---|---|
| 1,635,218 A | 7/1927 | Little et al. | |
| 2,268,854 A | 1/1942 | Boosey | |
| 2,284,737 A | 6/1942 | Hirshstein | |
| 3,862,040 A | 1/1975 | Preus et al. | |
| 3,957,656 A * | 5/1976 | Castelli | B01D 17/0208 210/521 |
| 4,055,499 A | 10/1977 | Laxo | |
| 4,178,252 A | 12/1979 | Krone | |
| 4,265,759 A | 5/1981 | Verpalen et al. | |
| 5,505,860 A | 4/1996 | Sager | |
| 6,056,128 A * | 5/2000 | Glasgow | B01D 17/045 210/522 |
| 6,139,730 A | 10/2000 | Buehler et al. | |
| 7,416,657 B2 * | 8/2008 | Kretchmar | B01D 17/045 210/DIG. 5 |
| 2003/0127376 A1 | 7/2003 | Maddock et al. | |
| 2008/0105616 A1 | 5/2008 | Allouche | |
| 2012/0312739 A1 | 12/2012 | Sowerby et al. | |

OTHER PUBLICATIONS

Oil Water Separator Technologies, LLC, "Oil Stop Valves for Major West Coast Utility Company", published Mar. 18, 2015, http://www.owstech.com/2015/03/18/oil-stop-valves-major-west-coast-utility-company/, accessed Mar. 1, 2024, 6 pages.

Oil Water Separator Technologies, LLC, "Oil Stop Valves", http://owstech.com/products/oil-stop-valves, accessed Mar. 1, 2024, 7 pages.

* cited by examiner

OVERLOAD PROTECTION CHAMBER FOR FLUID SEPARATION APPARATUS AND SYSTEM

FIELD

This disclosure relates to fluid separators, particularly those used in oil-removal equipment.

BACKGROUND

Coalescing oil/water separators are designed to remove oil or other insoluble material from a liquid, usually water. Removing and disposing of vegetable and animal oils are a challenge in the food processing industry. For example, water may be used to clean out the processing machinery, and a water/oil/debris mixture is the result. Other industries and oils, such as petroleum oils, may have similar problems. A coalescing separator can be used to separate oil from water for disposal, but the coalescing media is susceptible to be overwhelmed by oil.

Oil separators such as floating tube skimmers and floating weir skimmers can be used in relatively large bodies such as containment pools or ponds. Many applications are not conducive to such large systems. Coalescing separator units are often used with smaller systems to remove and recycle oil from the mixed fluids.

Coalescing separators sometimes utilize weir mechanisms to separate a layered oil and water portion from a column of water to produce a column of water that does not have the oil layer on top. This may be done by providing two walls: a first taller wall designed to block the oil and water layers from overflowing it and having an opening at the bottom, and a second shorter wall with no opening at the bottom and designed to allow a column of clean water to overflow into a column to be drained from the separators.

Small- and medium-sized separators can be portable and are conveniently deployed. Small- to medium-sized separators are capable of separating a large amount of oil from water over time, but the smaller the container, the more susceptible the system is to problems with overloading. For example, if a 10-gallon separator is suddenly influxed with a large concentration of oil, the oil level can overwhelm the separator and pass under the weir where only separated water should dwell. When this occurs, the separator may have to be taken off-line, cleaned, and/or replaced.

An overload protection chamber has primary utility when directly coupled to a source of mixed fluid, without any other separation apparatus in between. It allows for economically dealing with oil/water inputs of high variability, such as of 0 to 100% oil/water mixtures. Such high variability outputs may come directly from machinery or industrial processes without a large collection pool. A large amount of high oil content would quickly overwhelm the weirs in the coalescing separator apparatus, preventing the overloading of the coalescing separator apparatus described herein.

The articles "a," "an," and "the" should be interpreted to mean "one or more" unless the context clearly indicates the contrary.

SUMMARY

In an embodiment, an overload protection chamber for a mixed fluid separator includes a chamber bounded by walls for containing the mixed fluid; an oil-stop valve, disposed in the chamber. The oil-stop valve includes: a buoyant sealing member bounded and vertically moveable in a vertical column, the buoyant sealing member having a buoyancy to float in a first fluid and sink in a second fluid; and a drain hole at the bottom of the vertical column. The buoyant sealing member is configured to seal the drain hole when resting on the drain hole. The mixed fluid separator further includes: a mixed fluid inlet and an overflow weir having a top opening above a top of the column. Not all embodiments require the oil-stop valve in the overload protection chamber and a lower drain may be provided instead, such as an opening at or near the bottom of the overload protection chamber leading to the coalescing separator apparatus.

A mixed fluid separator apparatus includes an overload protection chamber and a coalescing separator apparatus. The overload protection chamber includes a chamber bounded by walls for containing the mixed fluid and an oil-stop valve disposed in the chamber. The oil-stop valve includes a buoyant sealing member bounded and vertically moveable in a vertical column, the buoyant sealing member having a buoyancy to float in a first fluid and sink in a second fluid; and a drain hole is at the bottom of the vertical column. The buoyant sealing member is configured to seal the drain hole when resting on the drain hole. The mixed fluid separator apparatus further includes: a mixed fluid inlet, an overflow drain having a top opening above the vertical column, the drain hole fluidly coupled to the coalescing separator apparatus. The coalescing separator apparatus includes: a containment well configured to include a coalescing media therein; an inlet fluidly coupled to the drain hole disposed on or near a first end wall and an outlet on a second end wall, the first and second end walls on opposite sides of the coalescing media. A surface-skimming drain or device or both is at least partially in the containment well.

A weir structure is also in the well and comprises a weir front wall and a weir middle wall. A height of the weir front wall is higher than a height of the weir middle wall. The weir middle wall extends to a bottom of the weir or the containment well and the front wall does not extend to the bottom of either the modular weir or the containment well, whereby a path is configured for fluid to flow under the weir front wall and over the weir middle wall to a compartment with the outlet.

A method for overload protection of a coalescing separator apparatus comprising: introducing a mixed fluid flow to a chamber; filling the chamber with the mixed fluid flow while the mixed fluid separates into top and bottom layers, the top layer comprising primarily a second fluid and the bottom layer comprising primarily a first fluid; flowing the bottom layer into a coalescing separator apparatus through a drain when the top layer is above a predetermined height; and flowing a top layer from the chamber when the top layer is above a predetermined height.

DETAILED DESCRIPTION

Disclosed herein is a dual-chamber mixed fluid separator apparatus with an overload protection chamber that prevents a large and sudden influx of oil from fouling the coalescing separator. To prevent sudden influx of a large concentration of oil from overwhelming the coalescing separator apparatus, a separate overload protection chamber is connected to the main coalescing separator apparatus. The overload protection chamber includes a water drain (majority water with some oil) to the main coalescing separator apparatus and an oil overload protection chamber (majority oil with some water) to drain excess oil when necessary to prevent overfilling of the coalescing separator apparatus 100. The overload protection chamber functions to rapidly separate and remove heavy concentrations of oil, protecting the main coalescing separator apparatus.

The device disclosed herein also incorporates both coalescing media and water/oil separation via a weir and a surface oil tube skimmer for total or near total oil removal. The coalescing separator apparatus depicted herein has two other notable features, a modular weir 170 for separating and a variable-height weir 110 for draining the surface.

The terms "oil" (lower density fluid, second fluid, or top layer) and "water" (higher density fluid, first fluid, or bottom layer) are used throughout to refer to a primary example, but other higher density and lower density fluids can be substituted for these. For example, fluids that are not miscible with another, wherein the lower density fluid rests on top of the higher density fluid when combined in a common container can be separated with apparatuses and methods disclosed herein. Some notable examples of high and low density fluids other than water and oil are machine coolant fluid (similar to antifreeze) and oil, and water and silicone.

Figure 1:
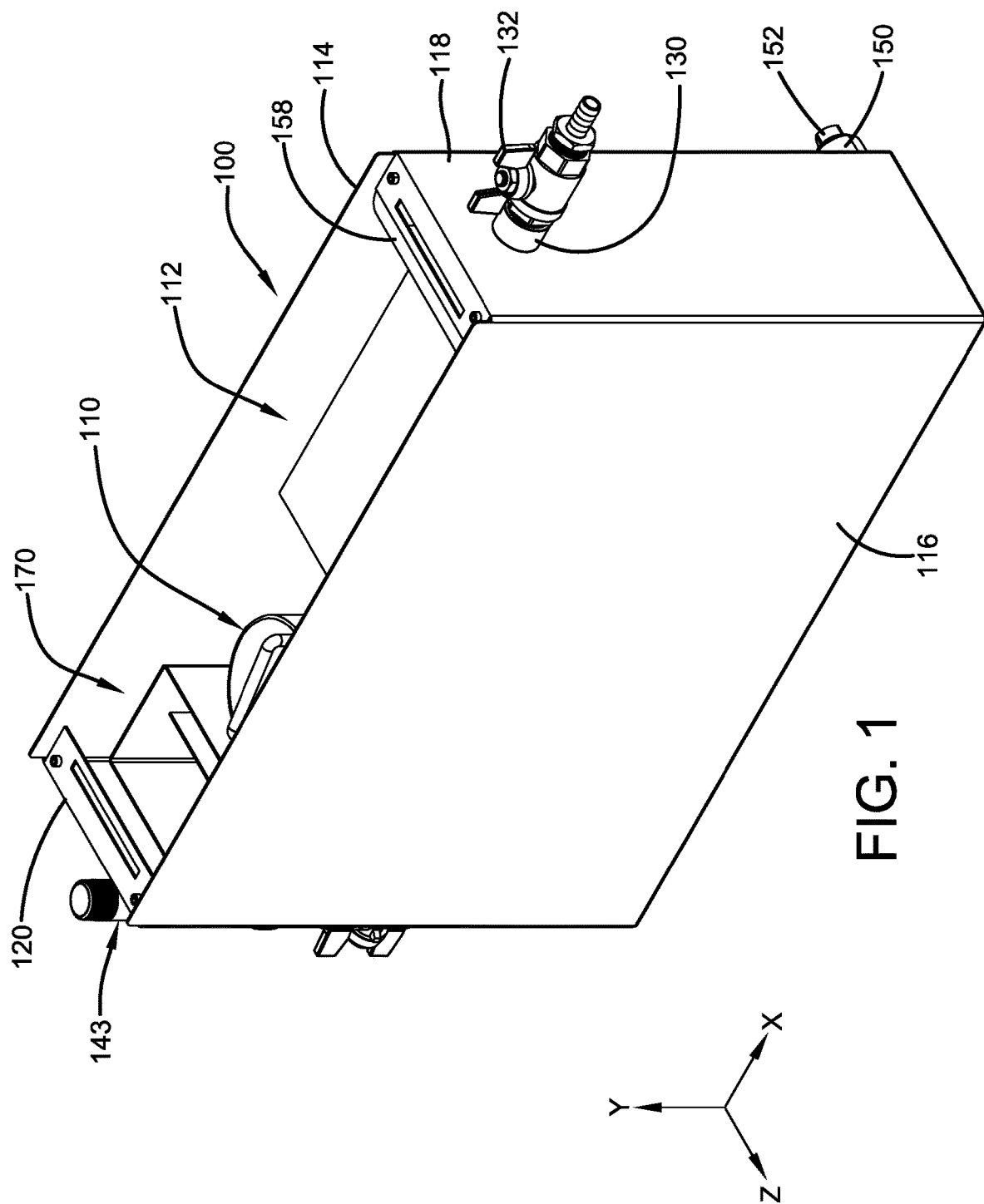
FIG. 1 is a perspective view of an example oil coalescing separator.
Figure 2:
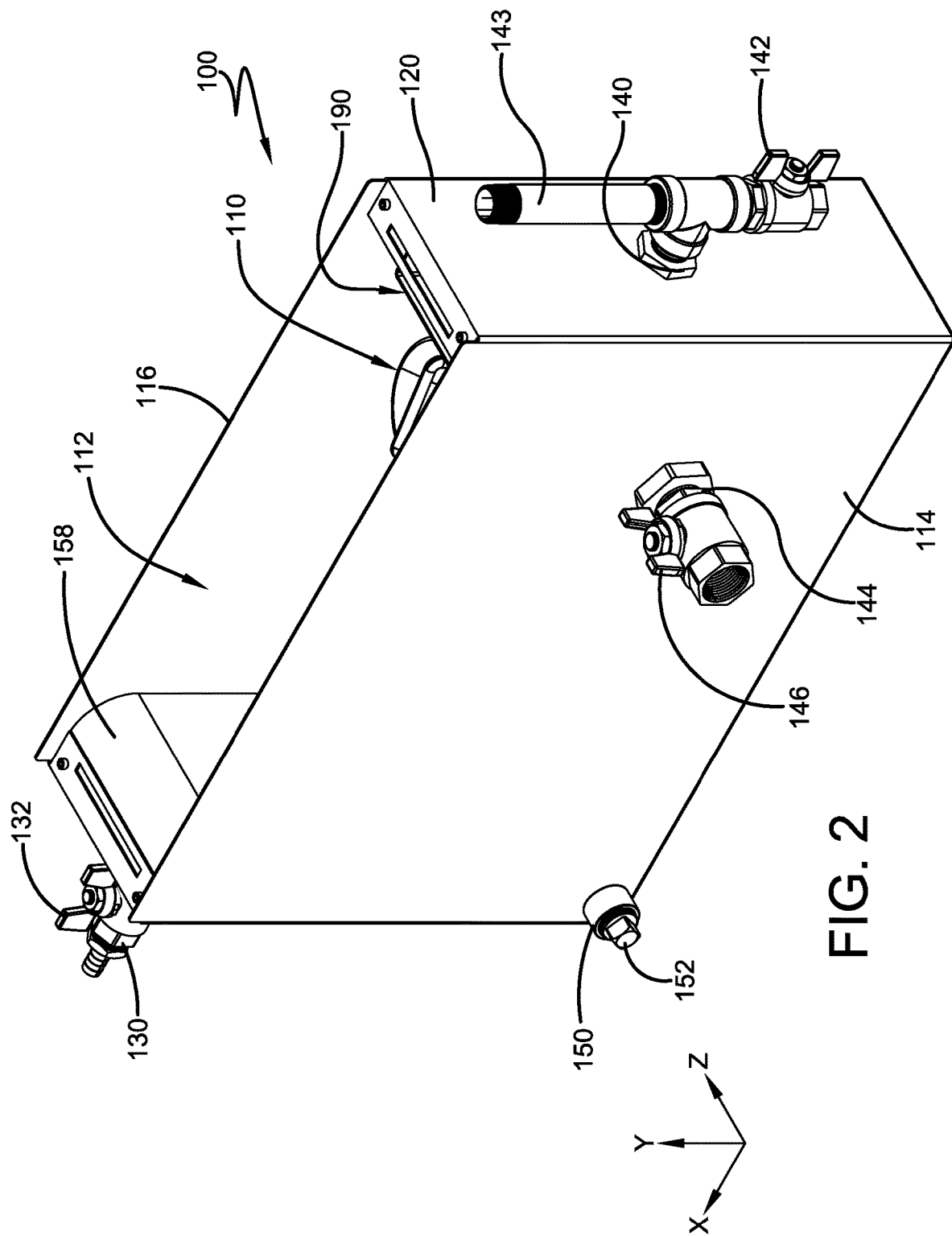
FIG. 2 is a perspective view showing a 180-degree rotation of the example oil coalescing separator of FIG. 1.
Figure 3:
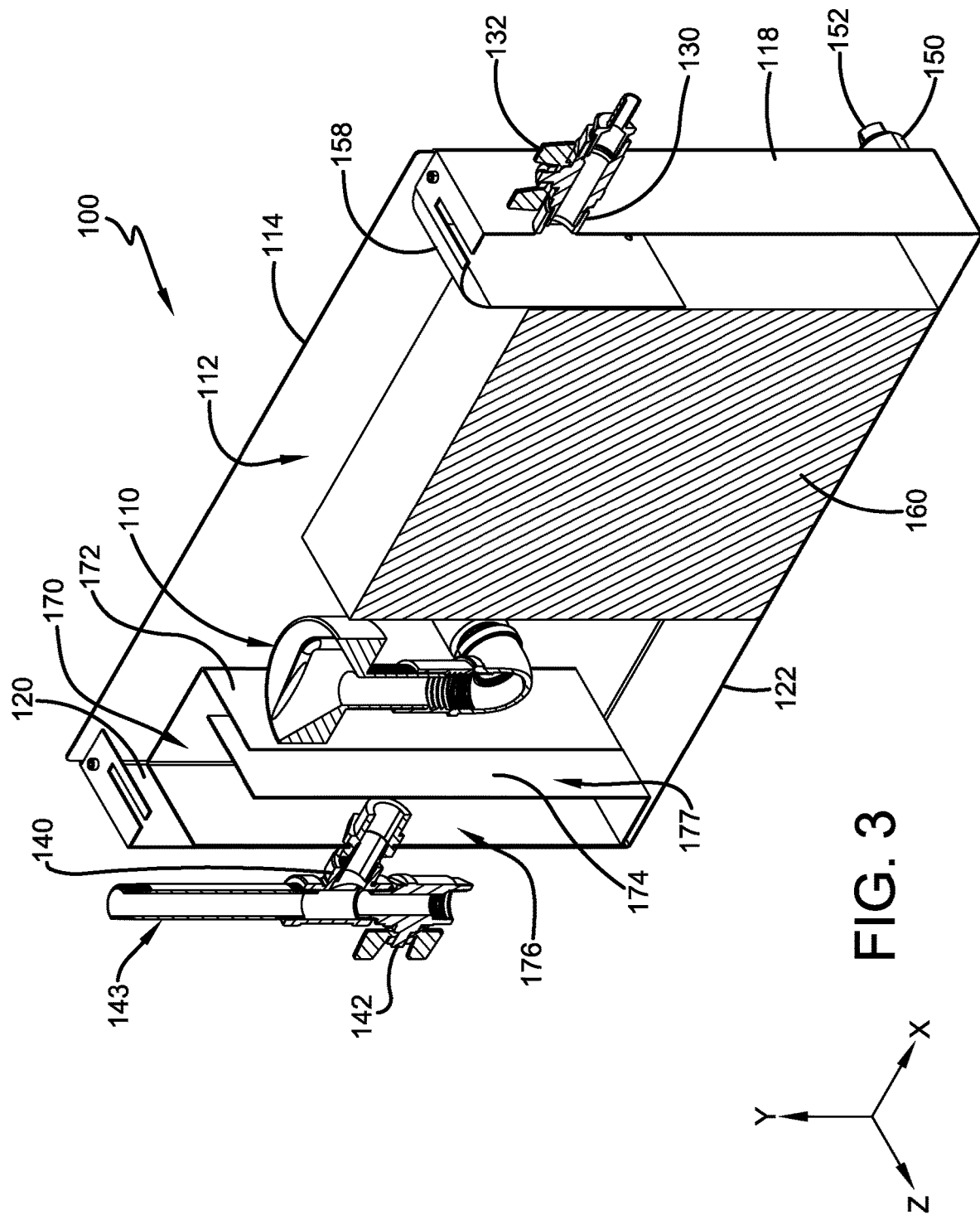
FIG. 3 is an x-axis cut-away perspective view of the example oil coalescing separator of FIG. 2.
Figure 4:
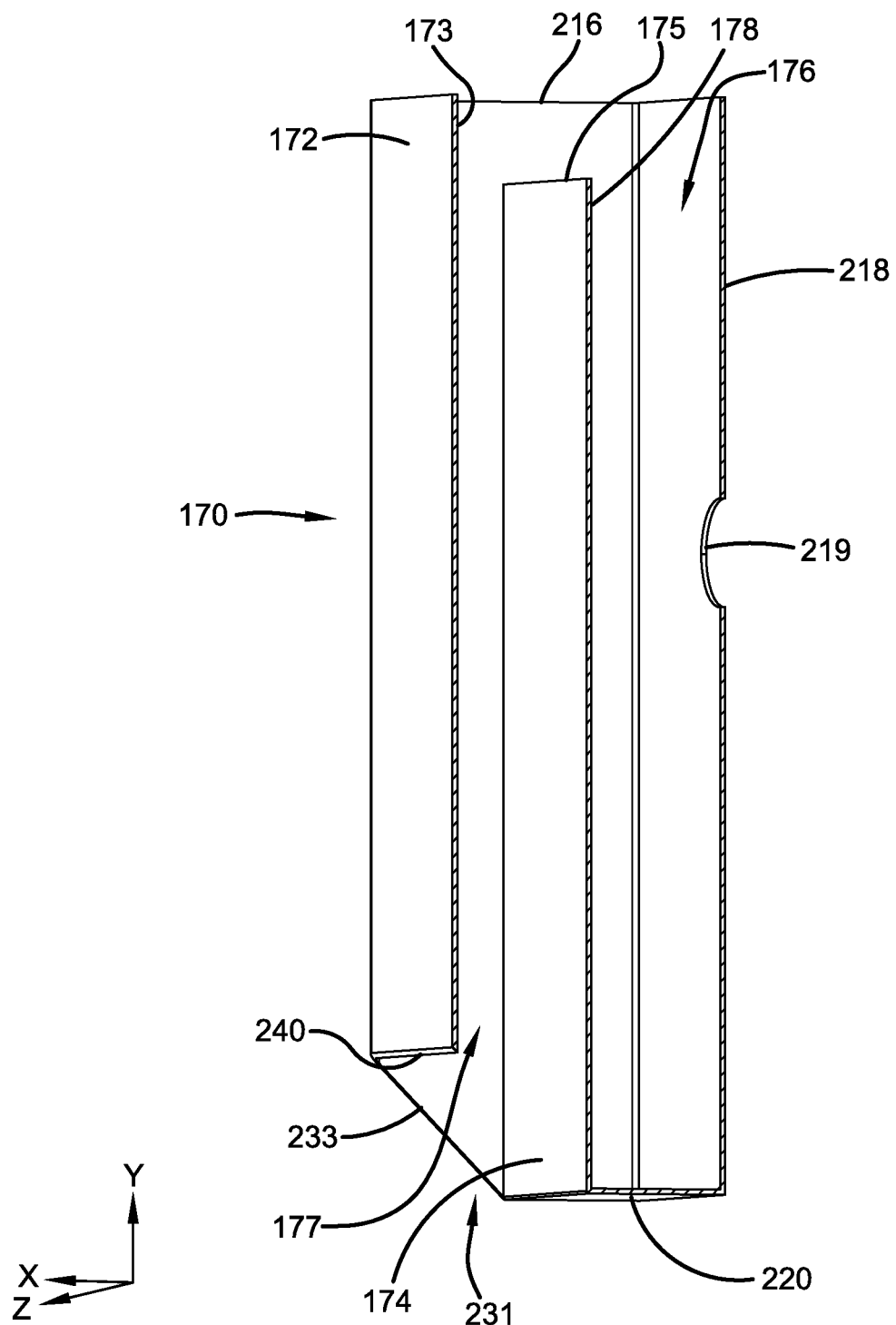
FIG. 4 is a cross-sectional view of an example modular weir.
Figure 5:
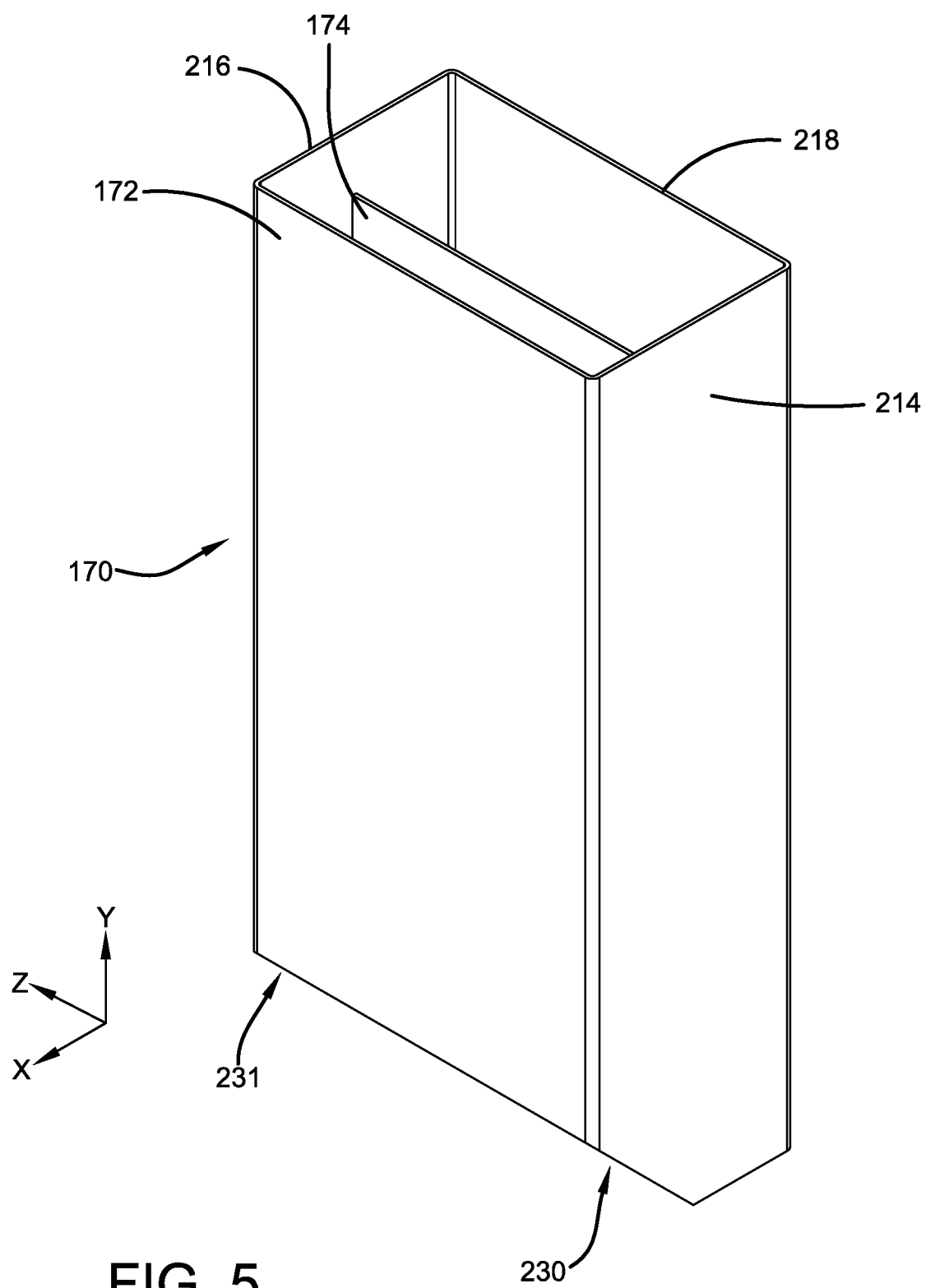
FIG. 5 is a perspective view looking down at the top and sides of the example modular weir.
Figure 6:
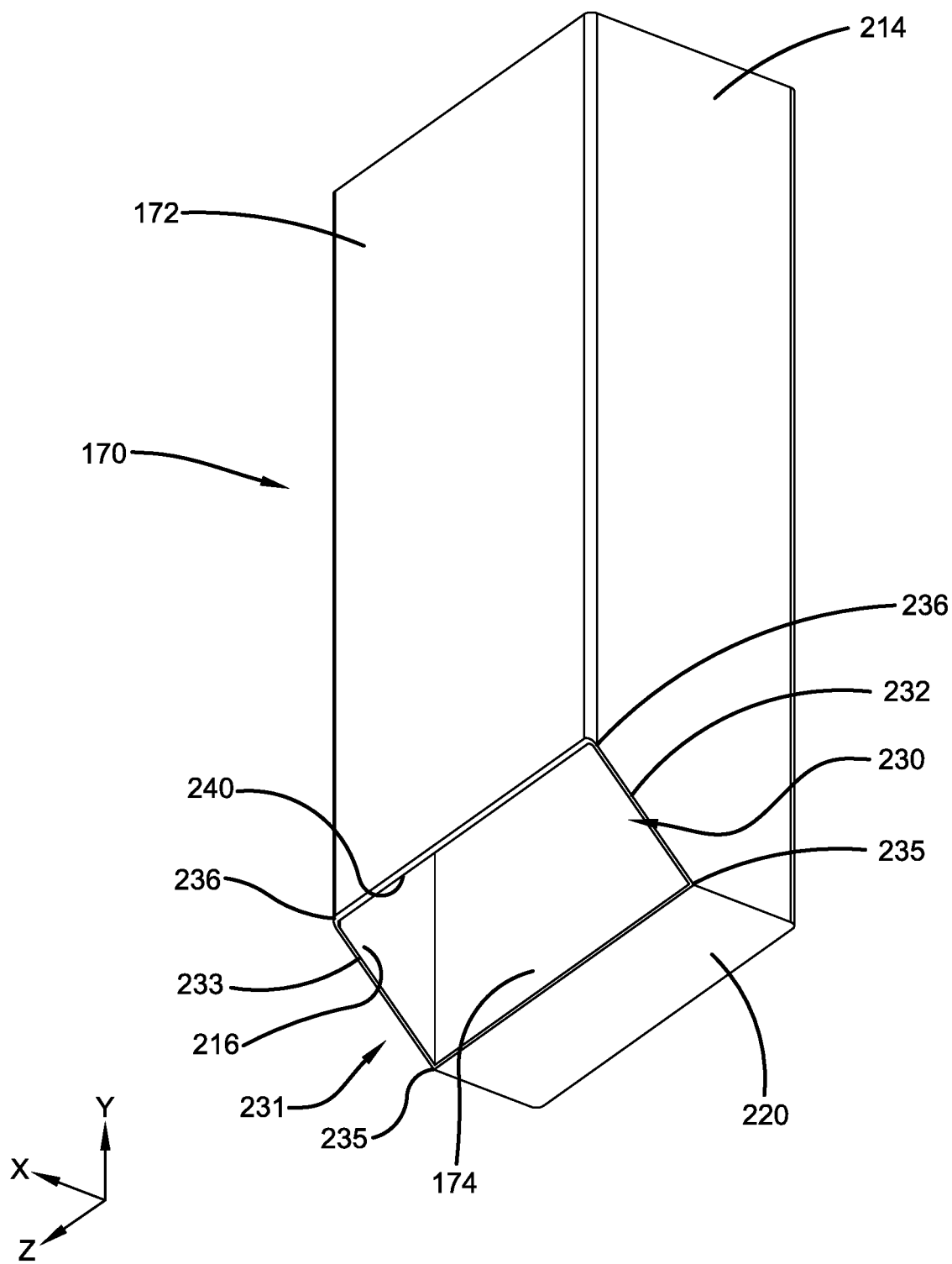
FIG. 6 is a perspective view looking up at the bottom and sides of the example modular weir
Figure 7:
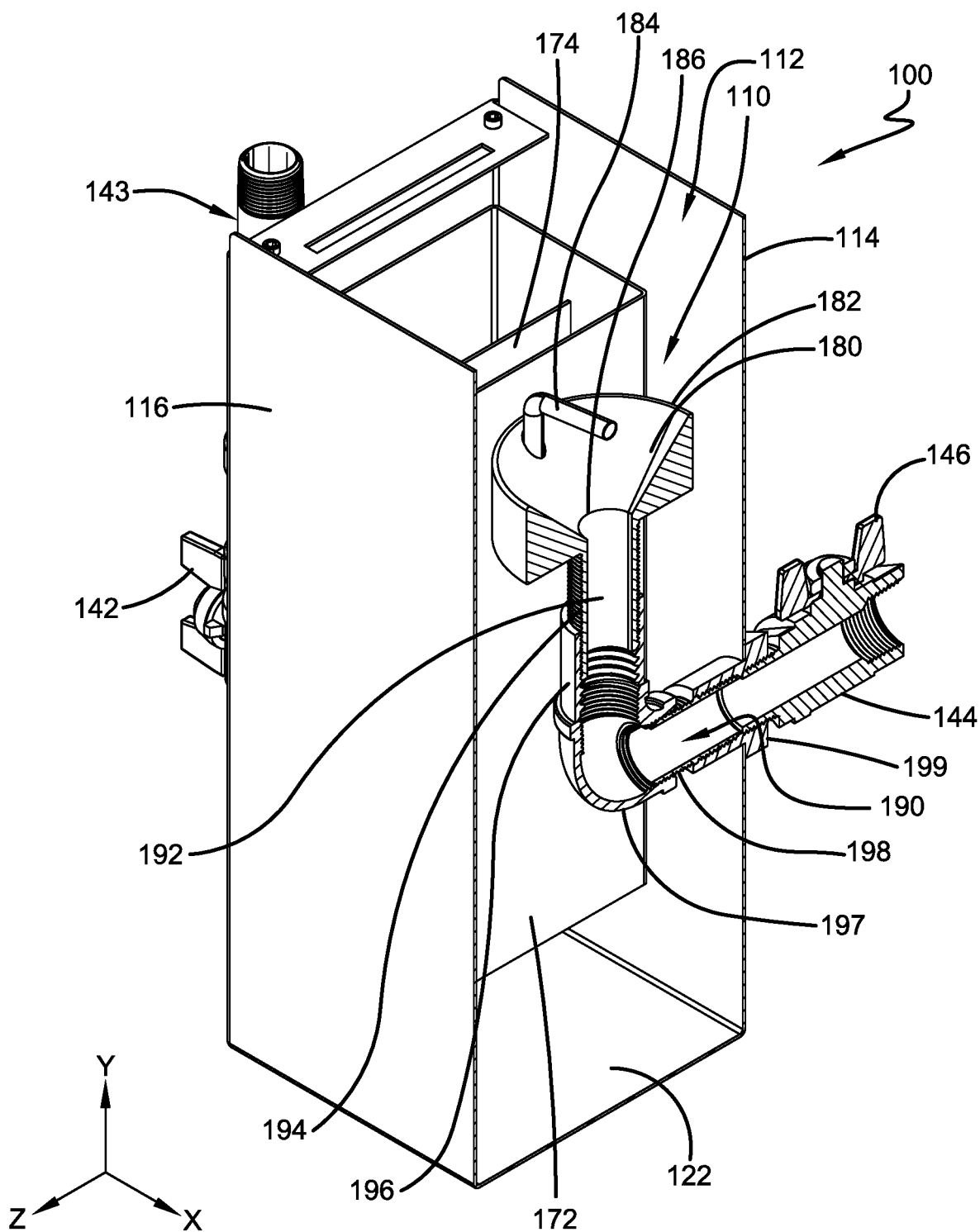
FIG. 7 is a cross-sectional view of an example oil coalescing separator including an example variable height weir in operation.
Figure 8:
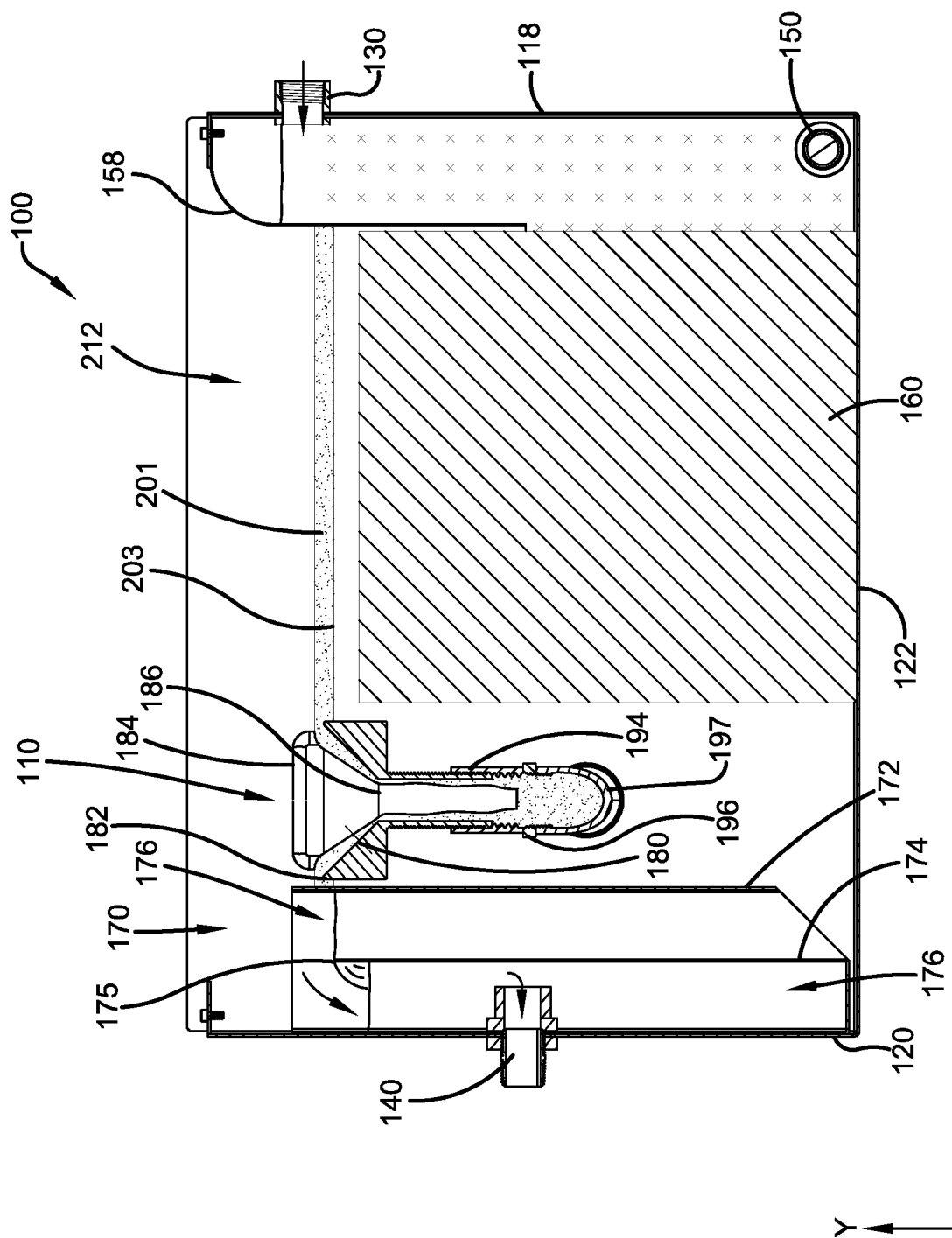
FIG. 8 is a diagram of an example coalescing separator apparatus is operation.
Figure 9:
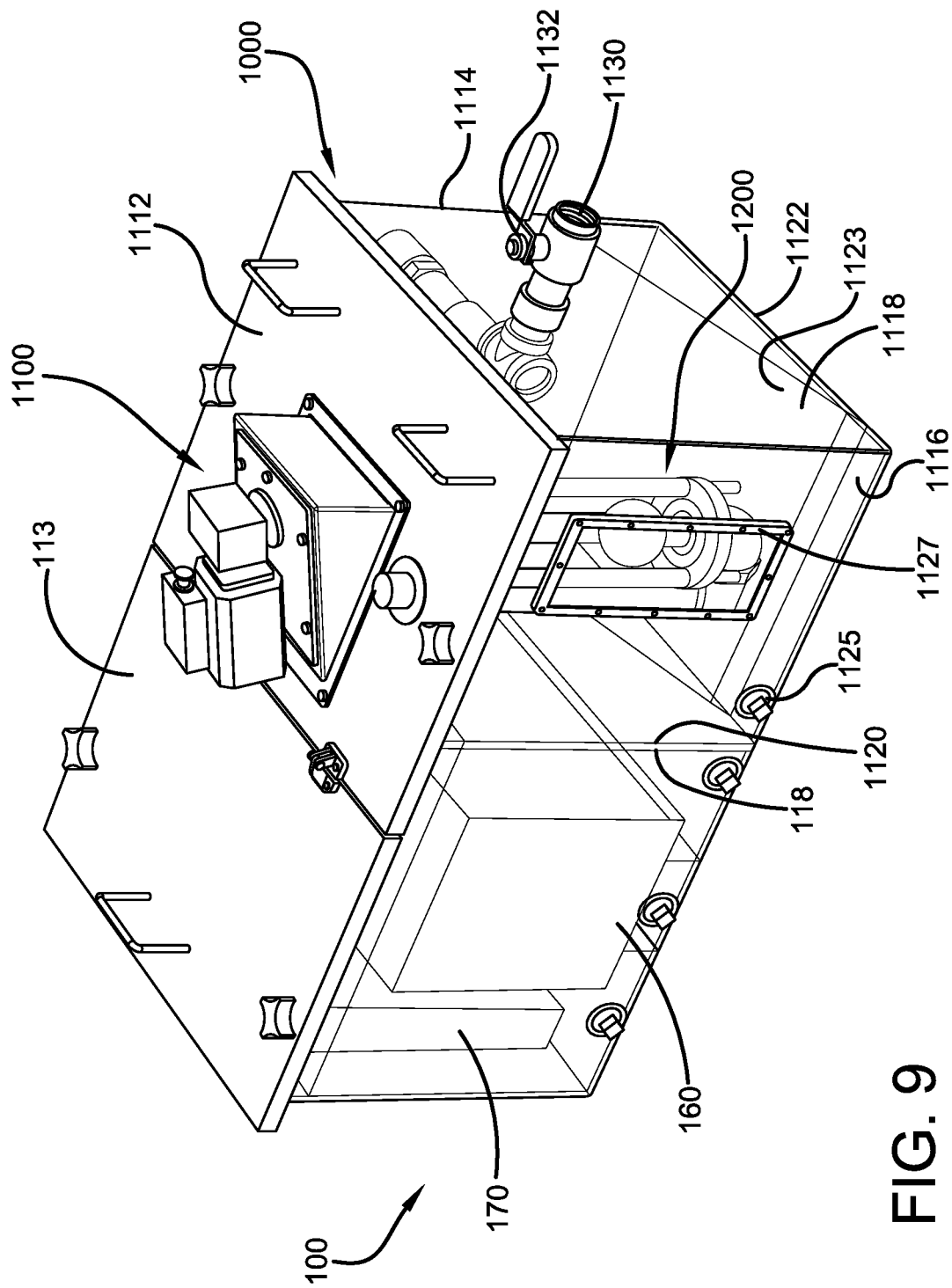
FIG. 9 is a partial transparent perspective view of an example separator apparatus including both an overload protection chamber and a coalescing separator apparatus.
Figure 10:
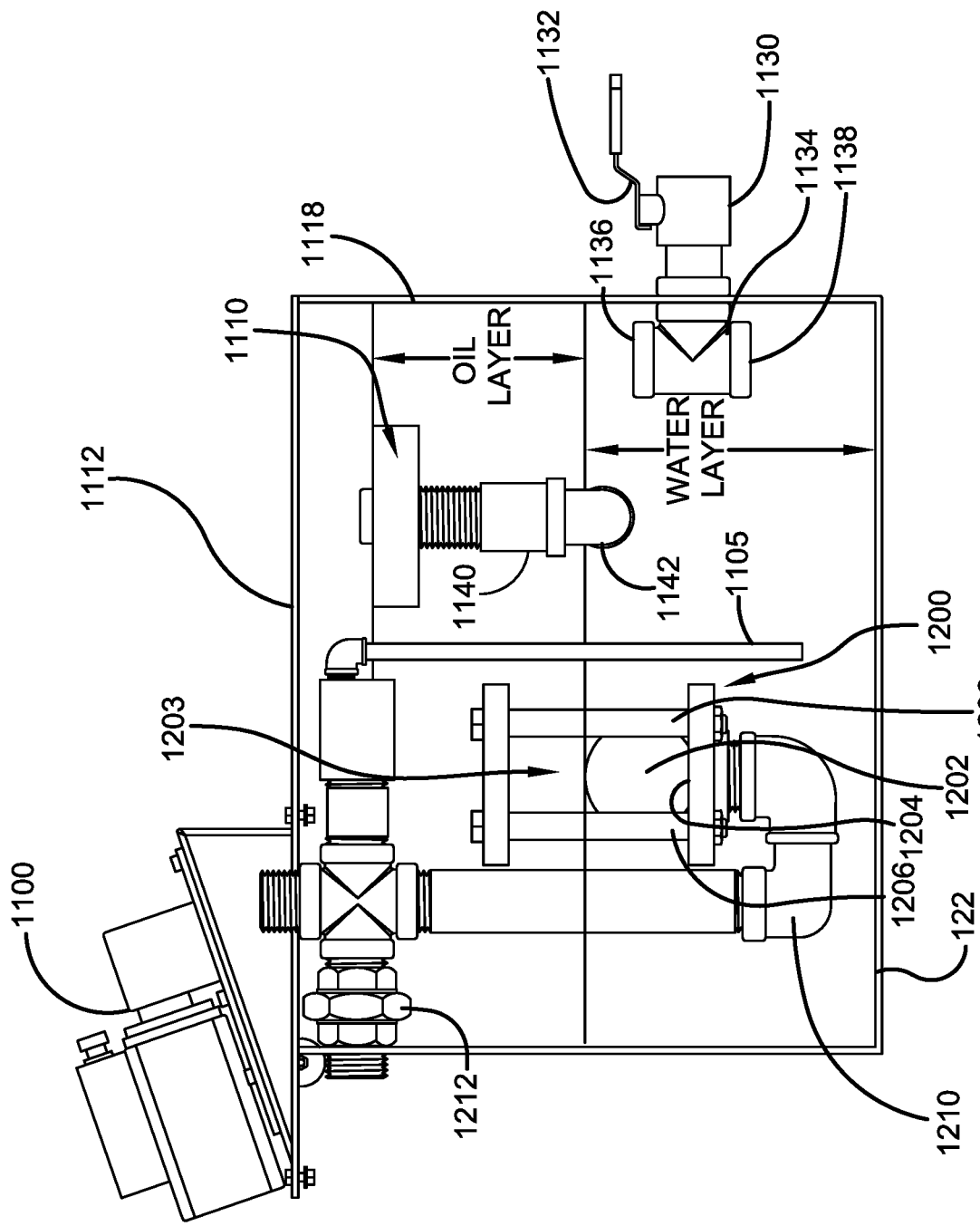
FIG. 10 is a cross-sectional view of an example overload protection chamber.
Figure 11:
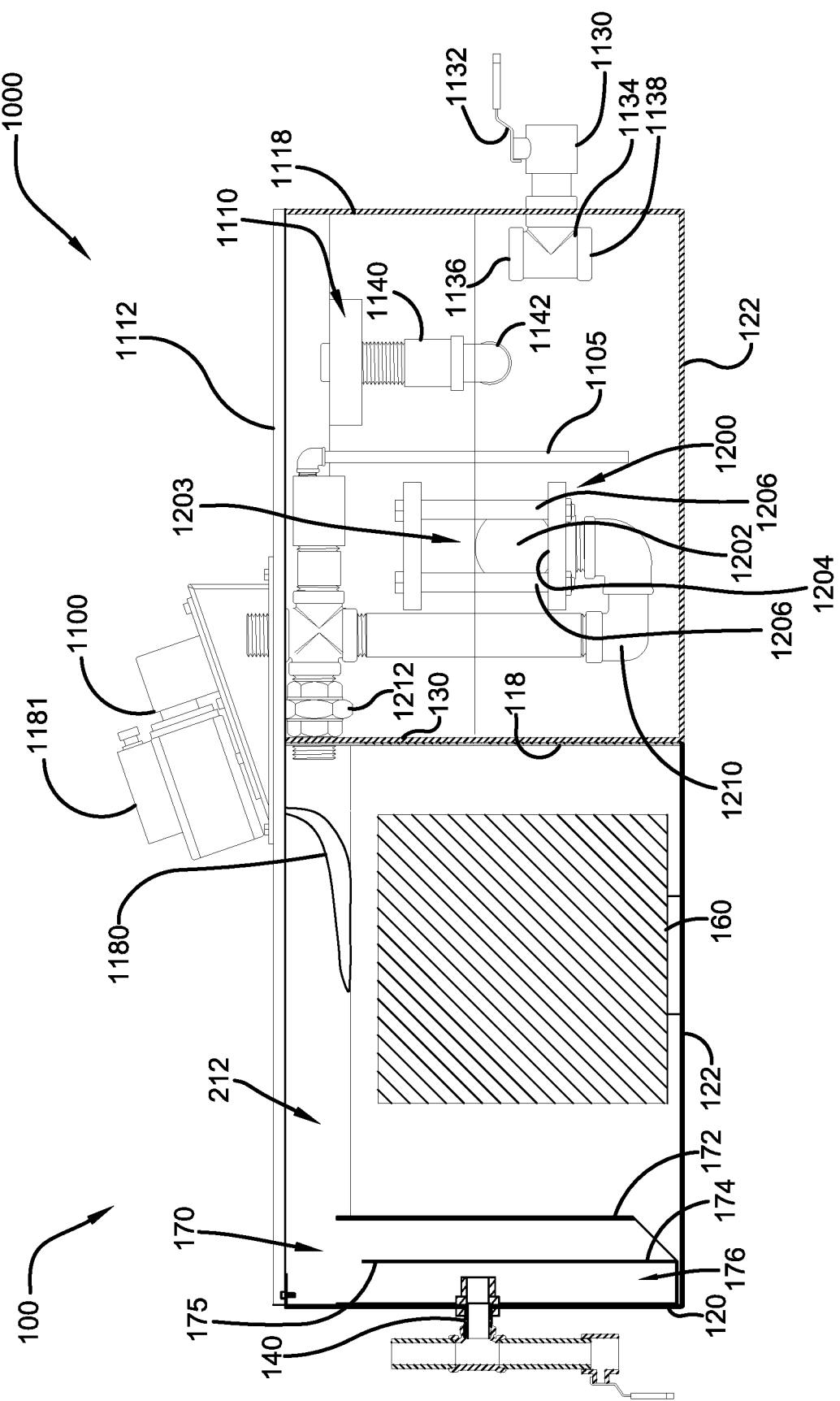
FIG. 11 is a cross-sectional view of an example separator apparatus including both an overload protection chamber and a coalescing separator apparatus.
Figure 12:
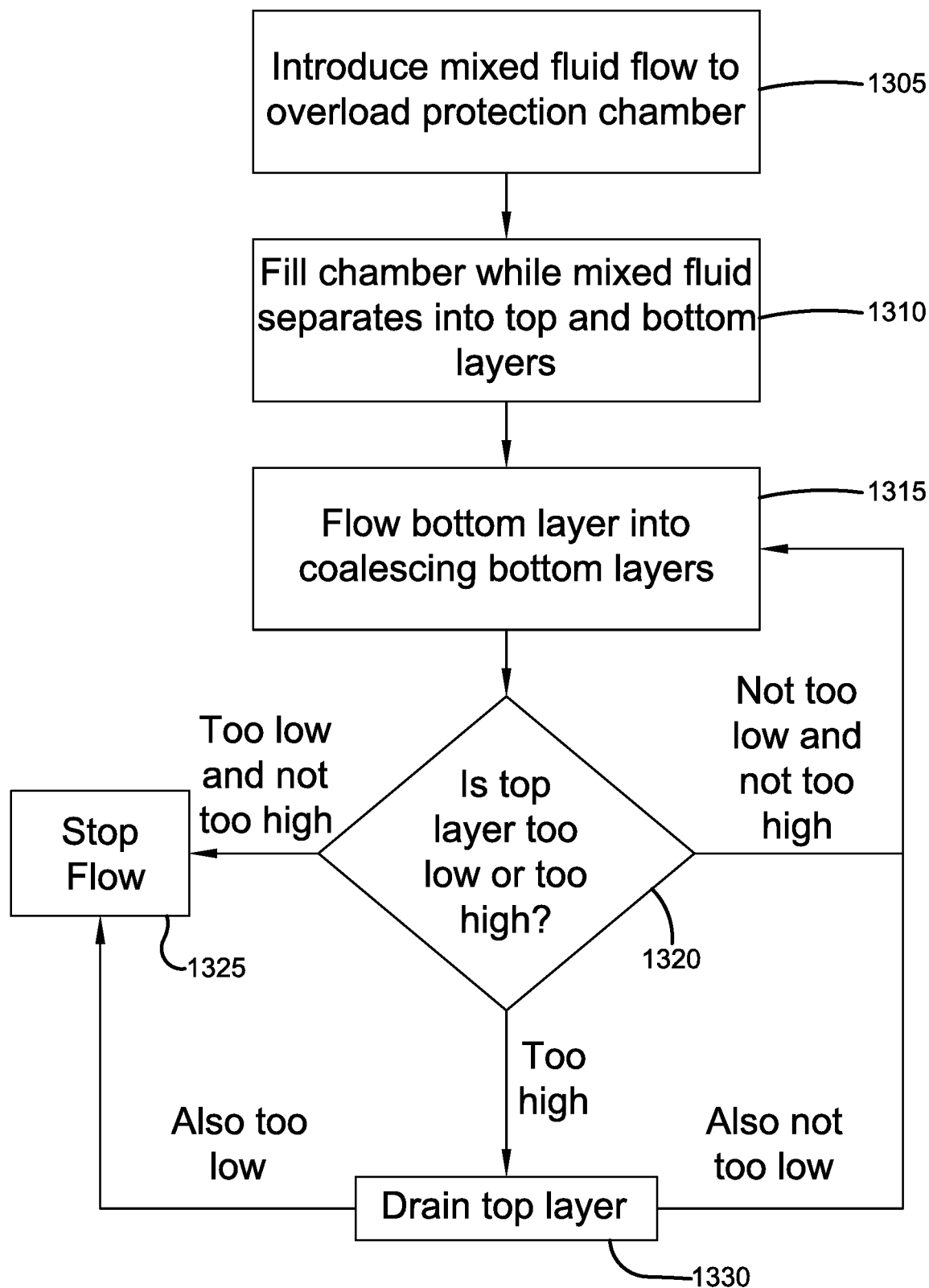
FIG. 12 is a diagram of a method for overload protection in a mixed fluid apparatus.

FIGS. 1-8 depict a coalescing separator apparatus 100 and parts thereof and FIGS. 9-11 include a depiction an overload protection chamber 1000. The overload protection chamber 1000 can be joined to the coalescing separator apparatus 100 of FIGS. 1-8, or it can be joined to a different separator apparatus. FIGS. 1-3 depict an embodiment of the coalescing separator apparatus 100. FIG. 4-6 depicts an optional modular weir 170. FIG. 7 shows an optional variable-height weir 110. FIG. 8 shows an embodiment of the system in operation. Finally, FIG. 12 shows a method flow chart.

FIGS. 1-8 show an embodiment of a coalescing separator apparatus 100 that includes an oil outlet (also referred to herein more generally as a surface-skimming drain), that is a variable-height weir 110 for draining or skimming the oil from the top of the coalescing separator apparatus 100. In embodiments, the variable-height weir 110 may be replaced by a fixed weir to skim and remove the oil from the coalescing separator apparatus 100. In the embodiment described herein, an optional modular weir 170 is provided in the coalescing separator apparatus 100. The modular weir 170 has a middle wall that extends to a bottom of the modular weir and a front wall that does not extend to the bottom of the modular weir 170, whereby a path is configured for fluid to flow under the weir front wall and over the weir middle wall. Alternatively, a fixed weir can be used that is permanently joined to the walls of the oil separator apparatus 100. The modular weir 170 is designed to be used in various sized separator apparatuses to divide the oil and water layered portion from a clean water portion. It is not permanently attached to the walls of the oil separator apparatus 100 but can be detached and removed or its position can be adjusted. In addition, the modular weir 170 may have an additional back wall and bottom wall that are not present in conventional systems that further acts to enclose the clean water portion from the oil and water portion. In such an embodiment, the joints of the modular weir 170 may be more easily and durably manufactured as the modular weir can be manufactured separately from the containment tank. In an embodiment, the modular weir 170 can be removed and cleaned without cleaning the entire separator apparatus. When removed from the apparatus the modular weir 170 is easier to clean than one that is affixed to the apparatus and could even be separately machined washed. Cleaning the modular weir 170 may be more important than cleaning other features of the device, as it provides the separation for clean water to exit the apparatus. A clean modular weir 170 can also be immediately swapped into the separator apparatus 100 in place of the dirty modular weir 170 to minimize down time of the apparatus. A set of modular weirs 170 can also have walls of various heights so that a weir height can be changed in an oil separator apparatus by substituting a modular weir 170 of a different height. In this way, the larger oil coalescing apparatus can be customized to a desired fluid level depending on the application by selecting an appropriate modular weir 170.

In an embodiment with the variable-height weir 110, the height is adjustable to allow a user to operate the coalescing separator apparatus 100 to directly remove a selected level of oil from the top surface of an oil/water mixture. This is in contrast to other separator devices, which only allow an adjustment of the total fluid (oil plus water) level in the entire containment well of the separator. Such devices do not allow fine control of the oil level being removed and also have the potential to disrupt the efficiency of a coalescing unit, by dropping the fluid level so low that part of the coalescing media is exposed to air. Adjusting the total fluid level in prior art solutions also requires either temporarily raising or lowering the inflow or outflow of fluid into the separator containment well and then readjusting it to an equilibrium level. In an embodiment, the apparatus described herein does not require two separate adjustments. As the viscosity and density of oil (or other fluids) differs from application to application, this provides a highly efficient way to finely adjust the level of oil that is removed from the top of the surface.

In an embodiment, the variable-height weir 110 for oil skimming has an upward-facing sloping surface, forming an inlet for the variable-height weir 110, wherein the inlet at its outer rim is wider and travels down an upward-facing sloping surface that narrows as it goes down to a channel leading to the oil outlet. By "upward-facing sloping surface" it is meant a non-vertically oriented and non-horizontally oriented surface, or that the surface is visible in a view directly vertical from the surface, but is not completely horizontal. This flow over the upward-facing sloping surface provides the operator a visual indicator of whether the oil being skimmed is (1) high purity oil, in which case a smooth flow will be visually apparent; or (2) a mixture with significant amounts of water, in which case droplets will tend to form on the upward-facing sloping surface.

As shown in FIG. 1, the coalescing separator apparatus 100 comprises a containment well 112 that is bounded by five walls: a first side wall 114, an opposing second side wall 116, a first end wall 118, an opposing second end wall 120, and a bottom wall 122 (see FIG. 3). The five walls are joined together, sealed at the joints to be water and oil tight, and form the containment well 112. Optionally, a top lid (not shown) may rest at the top of the containment well 112. The walls are made of a durable material that is resistant to oil, water, oxidizers, and other potential contaminants. For example, the walls may be made of metal, such as stainless steel and may be welded together at the joints.

The first end wall 118 is coupled to a mixed fluid inlet 130 that is also coupled to a valve 132. The outlet 1212 of the overload protection chamber 1000 (described in detail below) is connected to the mixed fluid inlet 130. In another embodiment, the mixed fluid inlet 130 runs from a larger containment pool where another type of oil separator is running to send dirty or oily water to the coalescing separator apparatus 100. The other type of oil separator may, for example, be a tube skimmer, or a pool surface skimmer. In another embodiment, the mixed fluid may be received into the mixed fluid inlet 130 directly from machinery or a coolant and oil containment pool. In an embodiment, the mixed fluid is pumped by a pump or gravity fed through the mixed fluid inlet 130 into the coalescing separator apparatus 100. In another embodiment, the mixed fluid inlet 130 may recirculate cleaned water from the same or another coalescing separator apparatus 100.

Referring to FIG. 2, which is a view showing a 180-degree rotation about the Y axis of the coalescing separator apparatus 100 from FIG. 1, the second end wall 120 is coupled to a clean water outlet 140, which is also coupled to a clean water outlet valve 142. The clean water outlet 140 is coupled to a stand-pipe 143. The clean water outlet 140 cycles water that has undergone treatment for removal of oil away from the coalescing separator apparatus 100 and back into usage in the machinery or to be safely disposed of. The term "clean water" is used in the sense that the bottom layer fluid has had lower density, immiscible, fluids removed from it through the coalescing and skimming apparatuses. However, this does not necessarily mean that the water or fluid is totally pure.

The stand-pipe 143 is configured to allow for variations in outflow volume, thus promoting continuous flow through the coalescing separator apparatus 100. A surge in fluid flowing through the clean water outlet 140 may rise into the stand-pipe 143, instead of being stopped at the clean water outlet 140 entrance and causing a backup in the coalescing separator apparatus 100.

The embodiment of FIG. 2 has the surface-skimming drain 144 (in this case referred to as an oil outlet 144 since it is discussed in terms of an oil and water mixture) coupled to the first side wall 114. The oil outlet 144 is also coupled to an outlet valve 146. Oil flows from the variable-height weir 110 into the oil outlet 144. The oil outlet 144 may lead to a collection tank (not shown), or, in an embodiment, it may feed directly back into the machinery it was originally used in. In an embodiment, the oil may be reused in the same or different machinery on-site after further purification, or it may be repurposed or disposed of.

A clean-out outlet 150 is also coupled to the bottom corner of the first side wall 114. A plug 152 is inserted in the clean-out outlet 150. The clean-out outlet 150 may be opened and used to remove all the contents of the coalescing separator apparatus 100 to clean it out from time to time. This may be done to replace or adjust the modular weir 170.

Other features inside the containment well 112, including the modular weir 170 are better seen in the cutaway view of FIG. 3. At the front of the coalescing separator apparatus 100 and coupled to the first end wall 118, and, optionally, the first and/or second side walls 114, 116 is an inlet deflector 158. The inlet deflector 158 extends from the first end wall 118 towards the center of the containment well 112 and curves towards the bottom wall 122. The inlet deflector 158 is configured to promote laminar flow into the containment well 112, prevent splashing, and direct the inflow of mixed fluid (e.g., oil and water) from the mixed fluid inlet 130 down to contact the coalescing media 160 (see FIG. 3). A smooth, laminar flow into the containment well 112 promotes the coalescing action.

The coalescing media 160 sits at the bottom of the containment well 112, abutting a portion of the bottom wall 122 and a portion of the inlet deflector 158. The inlet 130 and the clean water outlet 140 are on opposite sides of the coalescing media 160. The coalescing media 160 is typically a high surface area material and functions to provide a surface for oil droplets to coalesce and grow into large droplets. As the volume of the oil droplet increases the buoyancy of the droplets also increases and the droplets rise to the surface of the mixed fluid. The rate of rise is determined by Stoke's law and the droplets rise so long as the specific gravity of the oil is less than the specific gravity of water or other fluids that may be present in the mixed fluid.

The coalescing media 160, may, for example, be a series of stacked plates, a layered mesh, a porous structure, or a honeycomb-type structure. In an embodiment, the coalescing media 160 is an oleophilic material such as plastic, for example, polyethylene terephthalate (PET), polypropylene, and functional polymers. Carbon-based, porous material may also be used.

In an embodiment, the coalescing media 160 takes up a large percentage of the volume of the containment well 112. For example, the coalescing media 160 may have a volume that is 35% to 90% of the volume of the containment well 112, such as, for example, 55% to 85%, or 65% to 80%. Normally, the oil and water level in the containment well 112 should completely cover the coalescing media 160. In an embodiment, the oil/water interface is also above the coalescing media 160 as this is the most efficient level for coalescing the oil. To facilitate this, the level of the oil/water interface can be finely controlled by moving the variable-height weir 110 up or down. If a prior art, not variable-height weir is used instead, then some adjustment of the level can be controlled by adjusting the volume of the in-flow and out-flow.

FIG. 3 also shows the modular weir 170 at the far end of the containment well 112 from the inlet deflector 158. The modular weir 170 functions to separate the relatively clean water underneath the top oil layer. The modular weir 170 comprises a weir front wall 172 that has a height that is above the highest level that the variable-height weir 110 can be adjusted to. In an embodiment, the height of the weir front wall 172 may reach the height of the side walls and end walls 114, 116, 118, and 120 of the containment well 112.

The weir front wall 172 does not extend to the bottom wall 122 of the containment well 112 or to a bottom of the weir middle wall 174, but rather defines a passage between the bottom wall 122 of the containment well 112 and the two weir side walls 214, 216 (see FIG. 4-6), for clean water to flow past and underneath the front wall 172. The front wall 172 serves to block the oil layer near the top of the containment well 112, while allowing the lower water layer to flow through behind the front wall 172.

As is better seen in FIGS. 4-6, the two weir side walls 214, 216 of the modular weir 170 are joined to the front wall 172, middle wall 174, and weir back wall 218 which extend vertically along the two weir side walls 214, 216. In addition, a weir bottom wall 220 extends horizontally along the bottom of the modular weir 170 and is joined to the bottom edges of the two weir side walls 214, 216 and the weir back wall 218. The weir bottom wall 220 is not joined to the weir front wall 172. The weir bottom wall 220, advantageously allows for removal of the modular weir 170 and replacement with another modular weir of the same or different dimensions that does not allow any particulate contaminant resting at or near the bottom of the containment 112 to enter a clean water outlet compartment 176. The replacement or second modular weir may have one or more dimensions that vary between 10% to 500% of one or more dimensions of the first modular weir 170, such as 50% to 200%, or 75% to 150%.

In an embodiment, one or both of the two weir side walls 214, 216 have a cut-away portion 230, 231 at a bottom corner edge 232, 233 that deviates from a rectangular profile to allow for in-flow of clean water into the column 177 from the side. Generally, between the weir middle wall 174 and the weir front wall 172, the bottom corner edge 232, 233 of the opposing two side walls 214, 216 extends upward, toward the weir front wall 172, and intersects and joins with respective corners of the bottom edge 240 of the weir front wall 172. As shown in FIGS. 4-6, the bottom corner edges 232, 233 extend diagonally from the junction 235 of the weir side walls 214, 216 and the bottom of the weir middle wall 174 to the junction 236 with the weir front wall 172. By "short-cutting" this bottom corner edge 232, 233 this provides a wider mouth for the column 177 and allows water to enter the column 177 even if a substantial amount of particulate matter gathers at the front of the modular weir 170. This is particularly beneficial if the width of the weir front wall 172 is less than an interior width of the containment well 112, such as 5% or more smaller, 7% to 75% smaller, or 10% to 50% smaller.

The modular weir 170 also includes a weir middle wall 174 that extends to and is joined to the weir bottom wall 220, but extends to a height that is lower than the height of the weir front wall 172. In an embodiment, the height of the weir middle wall 174 is fixed relative to the modular weir 170, i.e., the other components of the modular weir 170. In another embodiment, the height of the weir middle wall 174 or a portion of the weir middle wall 174 is adjustable. In an embodiment, in normal operation, the height of the middle wall 174 is slightly below the height of the variable-height weir 110 or slightly below a fixed weir used in place of a variable height weir 110. The height is determined with reference to a bottom wall of the containment well 112 when the modular weir 170 is inserted in the coalescing separator apparatus 100. The modular weir 170 is intended and configured to be placed at the bottom of the containment well 112, but can in some instances be secured above the bottom of the containment well 112. If the modular weir 170 is separately considered outside of the containment well 112 or is not at the bottom of the containment well 112, the height of its various walls is determined with reference to the weir bottom wall 220.

In an embodiment, the weir front wall 172, the weir back wall 218, and the weir sidewalls 214, 216 extend to the same height, which is typically the full height of the modular weir 170. In an embodiment, the bottom edge 240 of the weir front wall 172 is at 3 to 35% the total height of the modular weir 170, such as, for example, 5% to 30%, or 10% to 25%. In other words, an open space between the bottom edge 240 of the weir front wall 172 and bottom wall 122 of the containment well 112 (if the modular weir 170 is set in a containment well 112) is 3 to 35% the total height of the modular weir 170, or 5% to 30%, or 10% to 25%. In an embodiment, the weir middle wall 174 extends from the bottom wall 220 of the modular weir 170 to 65% to 97% of the total height of the modular weir, such as 70% to 95%, or 75% to 90%. In an embodiment, the bottom wall 220 extends from the weir back wall 218 and ends at the weir middle wall 174.

A back side 173 of the weir front wall 172 and the weir middle wall 174 define the column 177 in which clean water enters and rises, and during normal operation the clean water will flow over a top edge 175 of the middle wall 174 into the clean water outlet compartment 176 that is bounded in part by the back side 178 of the middle wall 174 and the weir back wall 218. The first and second weir side walls 214, 216, also serves as a boundary to the clean water outlet compartment 176. The clean water outlet compartment 176 thus separates the clean water outlet 140 from the rest of the contents of the containment well 112.

As seen in FIG. 4, the weir back wall 218 includes a through-hole 219 that is configured to fit the clean water outlet 140. As shown in FIG. 3, the clean water outlet 140 extends through the second end wall 120 of the containment well 112 and through the through-hole 219 in the modular weir 170. Though not shown in explicit detail, the clean water outlet 140 may comprise a pipe extending through the second end wall 120 of the containment well 112 and through the through-hole 219 in the modular weir 170 with seals and fittings on both ends that can be tightened to insure a secure water tight fit. The fittings may be a releasable securing mechanism, such as a threadedly engaged nut or other structure that is screwed onto a threaded receiver on the clean water outlet 140 on the interior of the modular weir 170.

By forcing water to flow under the weir front wall 172 and then rising to flow over the weir middle wall 174, not only oil, which is primarily coalesced into the top surface layer, but also heavy particulates and other materials are removed (typically by settling to the bottom) from the water that flows into the clean water outlet compartment 176.

FIG. 7 shows an isolated cut-away of the variable-height weir 110, which is useable in certain embodiments of the present technology disclosed herein and can alternately be a fixed height drain or weir that is not adjustable. The variable-height weir 110 has an upward-facing sloping surface 180 that is funnel-shaped. The upward-facing surface 180 may, for example, have an angle of incline (wherein 0 degrees is defined as vertical (y-axis) and 90 degrees is defined as horizontal (x- and z-axis)) of 10 degrees to 85 degrees, such as 20 degrees to 60 degrees or 25 degrees to 45 degrees, as described above, this sloping surface provides visibility for the oil that is draining from the top of the surface of the oil and water in the containment well 112. The upward-facing sloping surface 180 has a top edge 182 that is circular and circumscribes the top of the variable-height weir 110. Other embodiments may have different geometries other than a funnel, such as, for example, inverted pyramidal or an oval or irregular shaped rimmed funnel. In an embodiment, the top edge 182 has the same height around the entire circumference.

The bottom edge 186 of the upward-facing sloping surface 180 circumscribes a vertical drain hole, which is coupled to an interior channel 190 that is coupled to and exits the coalescing separator apparatus 100 at the oil outlet 144. Various pipes and connectors define the channel 190 and are coupled to the oil outlet 144. The height of the oil outlet 144 in the containment well 112 is not adjustable. The height of the variable-height weir 110, when set to a fixed position, has a height that is fixed in relation to the fluid level and a height that is fixed in relation to the containment well 112.

The variable-height weir 110 includes a vertical shaft 192 that on the interior defines a portion of the channel 190 and on the exterior comprises an inclined continuous helical thread 194 around its circumference that is threadedly engaged to a threaded receiver 196. In this embodiment, the threaded receiver 196 is connected to an elbow joint 197 that is connected to a straight pipe 198 that is connected to the oil outlet 144, but other connectors could also be used. A sealing ring 199 fits over the straight pipe 198 and connects to the first side wall 114, sealing the containment well 112. The oil outlet 144 is also connected to the sealing ring 199. Rubber gaskets and seals may be used as needed or desired for any of the outlets, inlets, or junctions to, from, and within the containment well 112.

In an embodiment comprising the variable-height weir 110, the variable-height weir 110 is configured to be vertically movable and set to a position between a minimum height and a maximum height, the height being determined with reference to a bottom wall 122 of the containment well 112. In normal efficient operation the variable-height weir 110 will be adjusted to a level slightly above the height of the weir middle wall 174. The depth of the skimming of oil from the top of the surface can be controlled by raising or lowering the variable-height weir 110. If the operator wishes to stop the draining of oil and accumulate a greater volume and taller surface layer of oil, the variable-height weir 110 can be raised above the level of the top fluid surface. When the surface layer is thicker, this also insures a higher purity of oil flowing through the oil outlet 144, which may be desirable in some situations. A maximum height of the variable-height weir 110 should not exceed the height of the weir front wall 172. Normally, the variable-height weir 110 has a minimum height no lower than the top of the coalescing media 160 (see, for example, FIG. 8). Optionally, a clear window may be disposed one or more side walls 114, 116, in-line with the variable height weir 110, so that it is configured to show the thickness of the oil and water layers.

By rotating the variable-height weir 110, the height of the variable-height weir 110 will go up or down as the threads recede into the threaded receiver 196 or rotate out of the threaded receiver 196. Thus, the operator can adjust the height to a level desired for achieving the desired level of skimming from the top of the surface of the oil water mixture contained in the containment well 112. In other embodiments, another rotary type mechanism may be used to adjust the height of the variable-height weir 110. In yet other embodiments linear or other adjustment mechanisms may, for example, be used to raise or lower the variable-height weir 110 to a desired level.

In an embodiment, the variable-height weir 110 further comprises a handle 184 that extends from one side of the variable-height weir 110 to the other and spans over the drain hole. The handle 184 provides a useful way to rotate the variable-height weir 110 without the user having to touch the oily surface of the oil and water mixture. In an embodiment, the upward-facing sloping surface 180 is substantially uncovered (except for the unobtrusive handle 184) and open to view by the operator. In an embodiment, at least a portion of the upward facing surface 180 is uncovered from a top-down view, so that an operator can view the upward-facing sloping surface 180 from above the oil/water surface. This enables the operator to visually determine the desired level of oil skimming from the surface.

In an embodiment, the mixed fluid inlet 130 is configured to be open to allow about the same fluid volume to pass through as the clean water outlet 140 in combination with the oil outlet 144, so that a fluid level in the containment well 112 is substantially constant. Substantially constant means not interfering with the efficient operation of the apparatus. The fluid level, may for example, stay within 10%, 5%, or 1% of a baseline level over a ten-minute interval.

FIG. 8 is a cross-sectional view of an example coalescing separator apparatus 100 including an optional variable-height weir 110 in operation. In an embodiment, a method of separating oil from water (or any other set of fluids that are immiscible) comprises the steps of flowing a first and second fluid (e.g., water and oil) mixture from a mixed fluid inlet 130 into a containment well 112. The inflowing fluid mixture may be pumped or gravimetrically fed through pipes or tubes coupled to the mixed-fluid inlet 130. The oil and water mixture contacts a coalescing media 160 in the containment well 112, this causes the oil to coalesce from the water and form into droplets that rise to the surface and form an oil layer 201. The separated water flows under the weir front wall 172 of the modular weir 170, filling up the area between the weir front wall 172 and the weir middle wall 174 and flowing over the top edge 175 of the weir middle wall 174 into the clean water outlet compartment 176. The water then flows out of the clean water outlet 140. Often the mixture of oil and water contains heavy particulates, such as metal shavings that will settle to the bottom wall 122 of the containment unit 112.

The operator adjusts the variable-height weir 110 to a certain level to remove the desired level of oil from the oil layer 201 by draining at least a portion of the oil from the surface layer of oil through the variable-height weir 110. The oil flows through the variable-height weir 110 through the channel 190 and out of the containment well 112.

In an embodiment, the desired level may be at just above the oil/water interface 203, or just below the oil/water interface 203, such as, for example, from within 1 inch above or below the oil/water interface 203, within 0.1 inches above or below the oil/water interface 203, or within 0.01 inches above or below the oil/water interface 203.

In another embodiment, the level is adjusted to above the oil/water interface 203, such as 0.01 inches to 10 inches above the oil/water interface 203, 0.1 inches to 6 inches above the oil/water interface 203, or 1 inch to 2 inches above the oil/water interface 203. This may be useful in a mixture where different viscosities of oil or different types of immiscible fluid are present and the operator wishes to only drain off one level, and perhaps drain the second level after switching a container coupled to the oil outlet 144.

In another embodiment, the level is adjusted to below the oil/water interface 203, such as 0.01 inches to 10 inches below the oil/water interface 203, 0.1 inches to 6 inches below the oil/water interface 203, or 1 inch to 2 inches below the oil/water interface 203. This may be useful when the operator is seeking to ensure that as much oil as possible is removed from the water even if the removed oil includes some water content.

In an embodiment the operator visually determines the proper adjustment by viewing the oil flow on the upward-facing sloping surface 180. Water droplets may form on the upward-facing sloping surface 180, indicating that the variable-height weir 110 is skimming water and oil, which may indicate to the operator that the height needs to be adjusted.

In an embodiment, the operation of oil skimming can be halted by raising the variable-height weir 110 above the height of the middle wall 174 of the modular weir 170. When this is done, no oil or water will drain through the variable-height weir 110. This may be done when there is no visible layer of oil to skim from the surface, allowing the system to continue to flow efficiently, e.g., without shutting down pumps or adjusting other mechanisms. Eventually, if inflowing water contains oil, the thickness of the oil layer 201 will increase as clean water continues to flow over the middle wall 174 and into the clean water outlet compartment 176. If the oil layer 201 does not begin draining through the variable-height weir 110 as a result of its lower density allowing its level to rise higher than a pure water level, the operator can adjust the variable-height weir 110 down, so that the oil layer 201 or a portion thereof is skimmed and drained.

In another embodiment, the oil outlet 144 (surface-skimming drain) has a non-adjustable height and the operator can rely on opening or closing the outlet valve 146 to control the fluid level.

In operation, if an operator desires to change a fluid height of a coalescing separator apparatus 100 on a more permanent basis, a modular weir with a different weir middle wall 174 height can be swapped out for an existing modular weir. In addition, the modular weir 170 can be swapped out if an operator desires to change another parameter of the coalescing separator apparatus 100 controlled by the modular weir 170, such as, for example, the clearance from the bottom edge 240 of the weir front wall 172 to the bottom wall 122 of the containment well 112 to remedy particulates blocking the opening to the channel 177, or a height of the weir front wall 172 to prevent overflow of the oil layer 201 into the channel 177. It may also be desirable to swap the modular weir 170 as part of routine maintenance or cleaning, to reduce downtime of the apparatus 100.

Furthermore, with a modular weir 170, manufacturing various coalescing separator apparatuses 100 of different sizes and specifications is more easily achievable. The containment well 112 of different sizes can be combined with a modular weir 170 of one size. Alternatively, a modular weir 170 of a single size can be combined with containment well 112 of various sizes. In some embodiments the modular weir 170 can be placed in a containment well 112 that has much larger dimensions. For example, so long as the modular weir 170 has a weir bottom wall 220, the modular weir 170 need not reach the bottom wall 122 of the containment well 112. Welding or otherwise attaching the walls of the modular weir 170 is more easily done with the modular weir 170. Thus, use of the modular weir 170 may be advantageous for many embodiments or separating apparatuses with containment wells of various configurations, not just coalescing separators.

In an embodiment, a method of manufacturing includes constructing a containment well, such as containment well 112, that is configured to hold a fluid that includes at least an end wall with a through-hole. In some embodiments this containment well will be about the same width and slightly deeper (e.g. 5 to 20% deeper) than the modular weir 170, in other embodiments, the containment well can be larger in the width and height (e.g., 1.1 to 20 times larger, such as 1.5 to 10, or 2 5 times larger) than the modular weir 170. The method further includes dropping the modular weir 170 into the containment well 112. The modular weir 170 also includes the through-hole 219 and the method includes aligning the through-hole 219 in the modular weir 170 with the through-hole in the second end wall 120. An outlet, e.g., a clean water outlet 140, is inserted through the through-hole 219 in the modular weir 170 and the through-hole in the second end wall 120, and the clean water outlet 140 is secured to the modular weir 170 and the second end wall 120 of the containment well 112. The clean water outlet 140 may be secured by a fastener, on either side of the through-hole 219 in the modular weir 170 and/or either side of the through-hole in the end wall. The fastener may be a tight-fitting threaded ring, through which the outlet fits, and the outlet has matching threads, optionally with seals or gaskets also fitting between the ring and the respective wall.

In an embodiment, the modular weir 170 may be spaced away from the end wall, such as by securing the modular weir 170 to the outlet, wherein the outlet is elongated within the containment well extending into the containment well a distance such as 0.5 inches to 30 feet, such as 3 to 50 inches, or 10 to 25 inches. In this embodiment, the outlet should be secured on both ends of each of the two through-holes. Such a configuration allows for different configurations of components in the containment well, and may allow for larger coalescing media.

Swapping out the modular weir 170 can be done by draining the fluid from the containment well, such as containment well 112 shown in the Figures. Then loosening and/or removing the tensioning device, such as the nut on the end of the pipe that is part of the outlet 140 and extends into the containment well 112, may be done. The pipe is then removed from the through-hole 219 allowing the modular weir 170 to be lifted out of the containment well 112. A new modular weir 170 with one or more different dimensions is then dropped into place, the pipe is inserted, and tightened and sealed, which also secures the modular weir 170 to the second end wall 120 of the containment well 112.

With reference now to the overload protection chamber 1000; FIG. 9 shows an overview of the overload protection chamber 1000 coupled to an oil coalescing separator 100 (substantially as described above). The overload protection chamber 1000 is bounded by five walls: a first side wall 1114, an opposing second side wall 1116, a first end wall 1118, an opposing second end wall 1120, and a bottom wall 1122. The five walls 1114, 1116, 1118, 1120, and 1122 are joined together and sealed at the joints to be water and oil tight and form the overload protection well. An optional top lid 1112 may rest at the top of the overload protection well. Optionally, the slanted bottom 1123 is also disposed in the overload protection well. This directs heavy contaminants such as metal and sludge to one side of the overload protection chamber 1000, where a clean out drain 1125 and a panel 1127 are disposed on the second side wall 1116.

The walls 1114, 1116, 1118, 1120, and 1122 are made of a durable material that is resistant to oil, water, oxidizers, and other potential contaminants. For example, the walls 1114, 1116, 1118, 1120, and 1122 may be made of metal, such as stainless steel and may be welded together at the joints. The panel 1127 may be made of a transparent material such as glass or plastic to show the user the operational status of the overload protection chamber 1000.

A mixed fluid inlet 1130 is coupled to the first end wall 1118. A valve 1132 is coupled to the mixed fluid inlet 1130. In an embodiment, the mixed fluid inlet 1130 runs from a larger containment pool where another type of oil separator is running to send dirty or oily water to the overload protection chamber 1000. The other type of oil separator may, for example, be a tube skimmer, a pool surface skimmer, or machinery for removing oil from food processing equipment or a device for cleaning a tanker truck or trailer. In another embodiment, the mixed fluid may be received into the mixed fluid inlet 1130 directly from machinery or a coolant and oil containment pool. As explained above, a direct coupling to the machinery or industrial process without a large containment pool is a primary utility of the overload protection chamber 1000. In an embodiment, the mixed fluid (e.g. oil and water) is pumped by a pump or gravity fed through the mixed fluid inlet 1130 into the overload protection chamber 1000. The oil/water mixture (or other two immiscible fluids) may be in a ratio of 0 to 100:100 to 0, for example, 10 to 90:90 to 10, or 35 to 65:65 to 35. In an embodiment, the overload protection chamber 1000 holds an equal or larger volume than the coalescing separator apparatus 100, such as 100% to 1000%, 110% to 300%, or 120% to 175% the volume of the coalescing separator apparatus 100.

Disposed in the well of the overload protection chamber 1000 is an oil-stop valve 1200. Alternatively, it may be coupled to another wall or to the top lid 1112. The oil-stop valve 1200 is shown in more detail in FIG. 10. The mixed fluid inlet 1130 is also shown in more detail in FIG. 10 and described in further detail below.

With reference now to FIG. 10, the oil-stop valve 1200 is configured with a buoyant sealing member, which in the pictured embodiment is a floating ball 1202. The floating ball 1202 has a buoyancy configured to float in water (the bottom layer, first fluid), but not in oil (the top layer, second fluid). The ball 1202 is bounded in a column 1203, in this case a vertical column 1203 bounded by four vertical posts 1206. Other structures can also be used to hold the ball 1202 in a vertical column 1203, e.g., a partial hollow cylinder. A water drain hole 1204 (not visible) is at the bottom of the vertical column 1203 and the ball 1202 is configured to seal the water drain hole 1204 when resting on it. The water drain hole 1204 is coupled to piping 1210 which may be a series of pipe fittings or a single pipe, and the piping 1210 leads to the water outlet 1212, which in turn leads into the coalescing separator apparatus 100. As the oil content in the overload protection chamber 1000 increases, the ball 1202 will be forced down in the vertical column 1203 onto the drain hole 1204, covering it and sealing it from oil entering into the piping 1210. The terms oil and water here apply to any immiscible liquids as described above. In addition, the oil and water in the overload protection chamber 1000 are only rapidly and partially separated, so the water referenced here still contains entrained oil, such as 1 to 25%, or 3 to 15%, or 4 to 10% oil, and the oil has similar amounts of water in it as well. In an embodiment, the top layer is 100% to 75% oil and the bottom layer is 100% to 75% water.

The slanted bottom 1123 also provided the surprising benefit of increasing the abruptness of the lift off force caused when the oil/water level rises to move the floating ball 1202 off of the water drain hole 1204. A smaller fillable volume at the bottom of the overload protection well allows a faster rise in decanted water level, which increases the buoyancy force on the floating ball 1202, helping it to float with a lesser amount of decanted water.

The mixed fluid inlet 1130 passes through into the overload protection well and is coupled to a T-connection 1134 with an up-facing exit hole 1136 and a down-facing exit hole 1138. To the extent the oil and water are already separated or in the process of separating in the incoming flow, the phase with more oil in it will tend to exit through the up-facing exit hole 1136 and the phase with less oil in it will tend to exit through the down-facing exit hole 1138.

FIG. 10 also shows an oil overflow weir 1110, that is connected to piping 1140, which may be a series of pipes or a pipe, which in turn leads to an oil outlet 1142. In an embodiment the oil overflow weir 1110 has the same features as the variable height weir 110 described above. The oil overflow weir 1110 functions to remove excess heavy concentrations of oil from the top of the overload protection chamber 1000, thereby preventing overfilling and spilling out of the overload protection chamber 1000. The oil overflow drain 1110 has an up-facing top opening that is positioned above the vertical column 1203. In operation, the oil overflow drain 1110 is positioned at a height that will allow the weight of the oil and water mixture to push the bottom layer through the water drain hole 1204 up and into the water outlet 1212.

FIG. 10 illustrates an oil level and a water level in the overload protection chamber 1000. At this level, the ball 1202 has just engaged and sealed the water drain hole 1204, and the oil-stop valve 1200 has blocked further flow through the water outlet 1212, thereby protecting the coalescing separator apparatus from receiving the heavy concentration of oil in the oil layer or just beneath it. The ball 1202, may be made of a thermoplastic elastomer. The buoyancy of the ball 1202 may be adjusted to account for the specific gravity of different types of fluids and to fine tune the level at which the oil (or top layer fluid) pushes the ball 1202 down to seal the water drain hole 1204. The specific gravity of the ball 1202 should be between the specific gravity of the oil and water (or two fluids to be separated). In an embodiment, the ball 1202 has a specific gravity of 0.65 to 1.24, such as, 0.7 to 1.2, 0.9 to 1.1, or 0.97 to 0.99. In an embodiment, the specific gravity of the ball 1212 is set to allow for a maximum of 10% oil content to flow into the water drain hole 1204, such as a maximum of 8%, or 5%. This percentage may be a maximum oil content that the attached separator can efficiently handle. If more than this percentage of oil is introduced into a conventional coalescing separator, oil can both flow past the media rendering it ineffective as a tool to separate entrained oil from water, as well as build up on the media, which makes the unit ineffective and leads to excessive maintenance. The overflow protection chamber 1000 does not contain coalescing media and is intended to promote the separation of the excessive amount of oils from water as a first stage in the process. The overflow protection chamber 1000 allows excessive oil to build up and exit the system as collectible waste oil.

In an embodiment, a lower drain is used instead of an oil-stop valve 1200. The lower drain is fluidly coupled to the coalescing separator apparatus and may be positioned at or near the bottom of the overload protection chamber 1000. The lower drain 1200 may be an opening in a wall separating the coalescing separator and the overflow protection chamber 1000, e.g. opposing second end wall 1120, or a conduit leading between the two chambers. In this case, the oil overflow drain 1110 is positioned higher than the lower drain and is positioned at a height to allow the weight of mixed fluid to push a bottom layer of the mixed fluid (e.g. water) through the lower drain into the coalescing apparatus.

FIG. 11 shows a full cross-sectional view of the coalescing separator apparatus 100 joined to the overload protection chamber 1000. Here the tube skimmer 1100 can be seen mounted to the lid 1112, with an oleophilic tube 1180 running from the tube skimmer 1100 drive unit 1181. In the depicted embodiment, the coalescing separator apparatus 100 does not include a variable-height weir 110 but relies on the tube skimmer 1100 for removal of oil from the surface in the coalescing separator apparatus 100. The tube runs through an opening in the top lid of the coalescing separator apparatus 100. The tube skimmer 1100 operates by driving the floating oleophilic tube 1180 in a circular motion into the oil/water surface. The tube 1180 picks up oil, but not water on its surface, and the oil skimmed off the surface of the tube 1180 as it enters drive unit 1181. Oil is then drained away from the skimmer 1100. Other surface skimmers can be used instead of or in conjunction with the tube skimmer 1100, such as a disk type skimmer or a weir as described above.

In an embodiment, oil removed from the coalescing separator apparatus 100 by the tube skimmer 1100 will flow into the overload protection chamber 1000. As depicted in FIG. 10, oil from the tube skimmer 1100 flows into the overload protection chamber 1000 via an equalization tube 1105. The placement of the tube skimmer 1100 on the lid of the 1112 of the overload protection chamber 1000 facilitates this feature. Oil coming from the skimmer will also contain some (small) amount of water. By returning the skimmed oil/water to the overload protection chamber 1000, the water has a further opportunity to sink within the overflow protection chamber 1000. Thus, the water content of the oil removed from the apparatus 100 can be further minimized. In an embodiment the height of the entry into the equalization tube 1105 is slightly higher than the bottom of the mixed fluid inlet 130 and the entry to the equalization tube 1105 and the mixed fluid inlet are coupled, e.g. connected by a conduit. This allows the ball 1202 to float under its own buoyancy without an adverse liquid pressure under the ball 1202.

Alternatively, the skimmed oil can be deposited directly into the oil overflow weir 1110. Alternatively, the oil from the tube skimmer 1100, and the oil from the oil outlet 1142 of the overload protection chamber 1000 may lead into the same pipe or container for disposal or reuse. In an embodiment, the oil outlet 144 from the variable height weir 110 of the coalescing separator apparatus 100, and the oil outlet 1142 of the overload protection chamber 1000 may lead into the same pipe for disposal or reuse.

FIG. 12 shows a flow diagram of the operation of the overload protection chamber 1000. At 1305 a mixed fluid comprising a first and second fluid (e.g. water and oil) is introduced into the overload protection chamber 1000. At 1310 the overload protection chamber 1000 is being filled with the mixed fluid and the mixed fluid begins separating into a top layer (higher density/specific gravity) and bottom layer (lower density/specific gravity). At 1315 the bottom layer is flowed through a drain into the coalescing separator apparatus. Then at 1320, a determination is made based on the first and second fluid level and whether the ball 1202 is sealing the water drain hole 1204 as to whether the top layer level is too low and not too high, not too low and not too high, too high and also too low, or too high and also not too low. If the water drain hole 1204 is open, the top layer is not too low, and the flow of the bottom layer into the coalescing apparatus 1315 continues until the water drain hole 1204 is sealed. What is too low or too high is determined by a predetermined height and based on the height of the water drain hole 1204 and ball 1202. If the water drain hole 1204 is sealed, then the top layer is too low and the flow into the coalescing separator apparatus is stopped 1325, until the ball 1202 rises again and reopens the water drain hole 1204 returning the methodology to step 1315. If the inflow of the mixed fluid into the overload protection chamber 1000 ceases, the bottom layer will inevitably stop flowing 1325 into the coalescing separator apparatus. If the second fluid/top layer, is too high, then it will flow into the oil overflow weir 1110 draining the top layer 1330. The method allows for both draining the top layer and flowing the bottom layer into the coalescing apparatus simultaneously if the top layer is too high and the top layer is also not too low. Similarly, the method allows for both draining the top layer and stopping the flow 1325 into the coalescing apparatus simultaneously if the top layer is too high and the top layer is also too low.

In an embodiment, if the total fluid level becomes at or near the overload protection chamber 1000 well capacity, a fluid sensor may shut a valve and/or the process or equipment that is producing the fluid inflow into the overload protection chamber 1000. In another embodiment, a flow sensor coupled to the inlet can sense a slow in the flow and signal a pump to slow the inflow into the overload protection chamber 1000. However, in normal operating conditions where the ratio of the top and bottom layers are, for example, 15% to 95% water (bottom layer):85% to 5% oil (top layer), such as 20% to 90% water:80% to 10% oil, or 30% to 70% water:70% oil to 30% water, the overload protection chamber 1000 will both drain the top layer (oil) and flow the bottom layer (water) into the coalescing separator apparatus 100. Continuous operation of least one of these drains/flows is enabled despite fluctuations in the ratios of the layers because the ball 1202 will have an appropriate buoyancy in the mixed fluids to provide effective draining of excess oil from the top layer and water from the bottom layer. The use of a variable height weir, such as the one described above, for the oil overflow weir 1110 and the valve 1132 also help fine tune the chamber 1000 for continuous operation, such as to adjust for differences in oil viscosity (causing variance in the tendency of the oil to flow over the edge of the weir 1110. When oil content is too high, the water (bottom layer) will cease being drained until the excess oil is drained and the flow of mixed fluid brings in sufficient water to reopen the water drain hole 1204. In an embodiment, both the oil overflow weir 1110 and piping 1140 and the water drain hole 1204 and piping 1210 are of sufficient diameter to drain enough water to match the flow rate of the inlet 1130.

In an embodiment, the overload protection chamber 1000 may be used in a process to pretreat oil/water mixtures removed from a tanker truck or food processing equipment. In an example procedure, the following steps are performed. The tank or equipment is washed with hot water (e.g. 200° F. maximum) at a flow rate of e.g., 18 gpm maximum. For certain oils, a temperature of about 200° F., or 195° F. to 240° F., or 198° F. to 220° F. should be maintained in order to keep the oil in a liquid phase and flow properly. The hot water wash is used to remove a majority of the residual oils contained in the tank or equipment. The water will be pumped (e.g., by a non-shearing pump, such as a positive displacement or double diaphragm pump) directly from the tank or equipment to the overload protection chamber 1000. Due to the nature of some of the oils, which are being transported in tanker truck trailer or present in food processing equipment, it is possible that the initial discharge of the wash water will contain a high percentage of oil (e.g., 10% or more, higher than is normally advisable to run through a conventional oil water separator). At the end of the initial wash period, optionally, a detergent solution will be added to the water for a final cleaning, but this final wash solution is not sent to the overload protection chamber 1000 or oil/water separator.

In an embodiment, immersion heaters and/or pad heaters are added to the overflow protection chamber 1000, so as to maintain the temperature of the initial wash. These heaters will include internal thermostats to maintain the desired temperature and keep the oil in a liquid state. The elevated temperature of the liquid can be more easily maintained and require less energy with insulation of the overload protection chamber 1000. Accordingly, in an embodiment, insulation is provided around the overflow protection chamber 1000, such as with a 0.25" to 3", or 1" to 2" layer of fiber insulation protected by an aluminum skin. In elevated temperature systems stainless-steel media may also be provided in the system.

EXAMPLES

Two prophetic examples are provided to show where the oilstop valve overload protection chamber provides a special benefit to the oil removal system.

In both examples a first oil remediation tank has an overload protection chamber of dimensions 24×24×12 inches. It has a total capacity of 29.9 gallons. The oil has a density of 0.92, and the oil capacity of this chamber is 27.5 gallons (total capacity×density of oil). The gallons per inch depth of oil are 1.25 (total capacity/depth). The oil overflow depth is 22.08, which is the density of oil×the depth and the minimum underflow distance from the tank bottom is 1.92 (depth−oil overflow depth).

Prophetic Example 1

The oil removal application has a maximum intermittent expected oil slug of 15 gallons of oil. The intermittent oil depth is 12 inches, calculated from the maximum oil slug divided by the gallons per inch depth (1.25 as calculated above). This is a maximum depth of the oil layer in the overload protection chamber for this application. In this case the underflow clearance is 10 inches (calculated from depth of the tank—intermittent oil depth—the minimum underflow distance from the tank bottom). In this case, a stop valve is not required.

Prophetic Example 2

In this case an oil removal application has a higher maximum intermittent expected oil slug of 28 gallons of oil. The intermittent oil depth is 22.5 inches, calculated from the maximum oil slug divided by the gallons per inch depth (1.25 as calculated above). This is a maximum depth of the oil layer in the overload protection chamber for this application. In this case the underflow clearance is calculated to be negative 0.4 inches (calculated from depth of the tank—intermittent oil depth—the minimum underflow distance from the tank bottom). In this case, an oilstop valve would provide significant improvements to the system. Generally, the oil-stop valve provides a significant improvement to the system if the underflow clearance is near zero or negative, for example, 1 inch or less, 0.1 or less, or −0.001 or less.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner such as the term "comprising." The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A mixed fluid separator apparatus comprising:
an overload protection chamber and a coalescing separator apparatus;
the overload protection chamber comprising:
a chamber bounded by walls for containing the mixed fluid;
a lower drain fluidly coupled to the coalescing separator apparatus;
a mixed fluid inlet; and
an overflow drain positioned higher than the lower drain;
the coalescing separator apparatus comprising:
a containment well configured to include a coalescing media therein;
an inlet fluidly coupled to the lower drain disposed on a first end wall and an outlet on a second end wall, the first and second end walls on opposite sides of the coalescing media;
at least one of a surface-skimming drain at least partially in the containment well and a surface skimming device at least partially in the containment well; and
a weir structure comprising a weir front wall and a weir middle wall;
whereby a path is configured for fluid to flow under the weir front wall and over the weir middle wall to a compartment with the outlet.

2. The mixed fluid separator of claim 1, wherein the surface skimming device is present and the surface skimming device is a tube skimmer drive unit including an oleophilic tube that extends into the containment well.

3. The mixed fluid separator of claim 1, wherein the at least one of the surface-skimming drain and the surface skimming device are configured to drain into the overflow protection chamber.

4. The mixed fluid separator apparatus of claim 1, wherein the overflow drain is positioned at a height to allow the weight of mixed fluid to push a bottom layer of the mixed fluid through the lower drain.

5. The mixed fluid separator apparatus of claim 1, wherein the inlet of the coalescing separator apparatus is configured to be open to allow about the same fluid volume to pass through as the outlet of the coalescing separator apparatus in combination with the surface-skimming drain.

6. The mixed fluid separator apparatus of claim 1, wherein a height of the weir front wall is higher than a height of the weir middle wall; and the weir middle wall extends to a bottom of the weir or the containment well and the front wall does not extend to the bottom of the containment well.

7. The mixed fluid separator apparatus of claim 1, wherein overload protection chamber comprises a top fluid layer and a bottom fluid layer and the top fluid layer is 100% to 75% oil and the bottom fluid layer is 100% to 75% water.

8. The mixed fluid separator apparatus of claim 1, wherein the overload protection chamber holds a larger volume of mixed fluid than the coalescing separator apparatus.

9. The mixed fluid separator apparatus of claim 1, wherein the mixed fluid is oil and water.

10. The mixed fluid separator apparatus of claim 9, wherein the overload protection chamber rapidly and partially separates the oil and the water, and the separated water contains entrained oil in an amount of 1% to 25% oil.

11. The mixed fluid separator apparatus of claim 9, wherein the overload protection chamber rapidly and partially separates the oil and the water, and the separated water contains entrained oil in an amount of 3% to 15% oil.

12. The mixed fluid separator apparatus of claim 9, wherein the overload protection chamber rapidly and partially separates the oil and the water, and the separated water contains entrained oil in an amount of 4% to 10% oil.

13. The mixed fluid separator apparatus of claim 9, wherein the overload protection chamber rapidly and partially separates the oil and the water, and the separated oil contains water in an amount of 1% to 25% water.

14. The mixed fluid separator apparatus of claim 9, wherein the overload protection chamber rapidly and partially separates the oil and the water, and the separated oil contains water in an amount of 3% to 15% water.

15. The mixed fluid separator apparatus of claim 9, wherein the overload protection chamber rapidly and partially separates the oil and the water, and the separated oil contains water in an amount of 4% to 10% water.

16. The mixed fluid separator apparatus of claim 9, wherein the overload protection chamber limits a maximum of 10% oil content in the mixed fluid transferred to coalescing separator apparatus.

17. The mixed fluid separator apparatus of claim 9, wherein the overload protection chamber limits a maximum of 8% oil content in the mixed fluid transferred to the coalescing separator apparatus.

18. The mixed fluid separator apparatus of claim 9, wherein the overload protection chamber limits a maximum of 5% oil content in the mixed fluid transferred to the coalescing separator apparatus.

19. The mixed fluid separator apparatus of claim 9, wherein the overload protection chamber stops a flow of the mixed fluid to the coalescing separator apparatus based on a quantity of the oil in the overload protection chamber.

20. The mixed fluid separator apparatus of claim 1, wherein the overload protection chamber does not contain coalescing media.

* * * * *